Lucien Espagno
Claude Blanc
C.T. Huynh

3,533,220
PROCESS FOR SEPARATING ISOTOPIC COMPOUNDS BY ABSORPTION

Lucien Espagno and Claude Blanc, Pau, France, and Chanh Trung Huynh, Jurancon, France, assignors to Société Anonyme dite: Société Nationale des Petroles d'Aquitaine
Filed Feb. 13, 1967, Ser. No. 615,570
Claims priority, application France, Feb. 15, 1966, 49,575
Int. Cl. B01d 57/00
U.S. Cl. 55—19                                   5 Claims

ABSTRACT OF THE DISCLOSURE

This invention relates to a method for extracting at least one enriched fraction from an isotopic mixture. The isotopic mixture is suspended in a gaseous carrier. The presence of an enriched fraction is detected by a mass spectrometer and said fraction is collected by control means responsive to the indications of said spectrometer.

---

It is known that isotopes are very similar chemical elements which generally canont be differentiated except by physical processes which normally make use of the slight differences in mass between them.

Isotopic compounds are chemical compounds having identical structures but which differ due to the fact that at least one of their elements is present in the form of isotopes having different masses.

Various processes are known for obtaining in the pure, or at least greatly enriched, state a given isotopic compound, starting from an isotopic mixture such as, for example, these found in nature.

One known process makes use of the diffusion of isotopic compounds in the gaseous state through a porous wall, the enrichment being due to the difference in rate of diffusion between the two isotopic compounds.

Another known process involves centrifuging an isotopic mixture at high speed to obtain an enrichment of one of the two compounds.

Use of techniques based on gase chromatography to separate the isotopes of hydrogen for analysis has also been suggested.

In these processes, however, it is usual to start with hydrogen which has been previously enriched in one of its isotopes.

Moreover, it should be noted that the chromatographic techniques have been suggested only for the separation of isotopes of hydrogen whose atomic masses differ notably and whose separation is consequently relatively easy.

On the contrary, the present invention deals with a process for separating and enriching isotopic compounds consisting of heavier elements for which the differences between the atomic masses are relatively quite small.

The object of the present invention is to provide a new process for enriching or separating at least one isotopic compound. It is characterized by the fact that it comprises at least one step in which relatively small quantities of the isotopic mixture in the gaseous state are periodically injected into a continually circulating gaseous carrier. The gaseous carrier along with the isotopic mixture circulates in an enclosure containing a porous absorbing medium which is inert with respect to the gaseous carrier. The appearance of the isotopic mixture, or one of its constituents, at the exit of the enclosure is detected, and this detection is used to control the collection of successive fractions of the isotopic mixture in different containers.

In one preferred embodiment of the invention, the different fractions collected as indicated above are recirculated in the same enclosure.

In a preferred method, each of the collected fractions containing isotopic compounds undergoes separation of the isotopic compounds and of the gas carrier. Thereafter, only the isotopic compounds are introduced into a new adsorbent enclosure or are recirculated in the same enclosure.

According to one preferred embodiment of the invention, a mass spectrometer is used to detect the isotopic mixture leaving the separation enclosure. This permits continuous determination of the instantaneous enrichment factor of the mixture in one of the isotopic compounds so that the collected fractions may be directed toward different containers to facilitate enrichment.

The instantaneous enrichment factor is the difference between the standardized integrals of the numbers of individual particles of isotopic compounds of two different masses leaving as a function of time, at a gievn instant.

The standardized integral is the ratio of the integral of one function taken in the time interval $-\infty$ to $t$ to the integral of the same function taken from the times $-\infty$ to $+\infty$ In other words, the standardized integral at an instant $t$ is the ratio of the number of individual particles of an isotopic compound which have already left to the number of particles of the same isotopic compound which will finally leave the enclosure.

According to this preferred embodiment of the process according to the invention, in which the instantaneous enrichment factor is used to direct the removal of different fractions of the isotopic mixture leaving the enclosure, it is possible to determine with great precision the instants determining the collection of the different fractions, this being necessary in order to obtain an appreciable cumulative rate of enrichment.

According to this preferred embodiment of the invention, it is thus possible to separate isotopic compounds of heavy elements whose masses differ relatively only by a few percent at the most.

Another object of the present invention is to provide the new article of manufacture consisting of an apparatus for carrying out the above-defined process. This apparatus is essentially characterized by the fact that it consists of a combination of: an enclosure containing a porous adsorbing medium which is inert with respect to the carrier gas to be used in the separation, means for circulating the carrier gas inside the enclosure, means for periodically injecting predetermined quantities of the isotopic mixture to be separated into the gas carrier, and a detector to reveal the arrival of the isotopic mixture or of an isotopic compound at the exit of the enclosure and to direct the removal of different fractions of said isotopic mixture.

In accordance with the invention, the enclosure containing the adsorbent product may consist of a tubular column whose length is much greater than its diameter.

The porous adsorbing body may consist, for example, of a molecular sieve whose internal pores have dimensions of between 1 and 300 A. or of activated charcoal or of an activated silica gel.

The carrier gas may consist, for example, of a rare gas such as helium, argon or neon.

The gas carrier may be circulated by any known apparatus such as a pump or a source of carrier gas under pressure.

Periodic introduction of the gaseous isotopic mixture into the carrier gas may be easily accomplished, using, for example, a valve with several ducts placed on the inlet pipe which admits the carrier gas to the enclosure. This valve permits periodic interruption, for a short time, of the circulation of the carrier gas, so as to introduce into the latter a given quantity of the isotopic mixture to be separated.

In one preferred embodiment of the invention, the detector consists of a mass spectrometer with several ion collectors emitting an electric signal in proportion to the instantaneous concentration of each of the isotopic compounds. Each current thus discharged by the mass spectrometer may be integrated in the usual way. Each of these integrals may then be standardized by dividing it by the fixed value consisting of the complete integral corresponding to the same isotopic compound, this integral having been measured during an earlier passage of an identical sample.

It may be seen that, by means of this preferred embodiment of the invention, it is possible to provide an electric quantity constantly proportional to the instantaneous enrichment factor of one isotopic compound with respect to another compound.

In an alternative embodiment of this invention, a mass spectrometer with a single ion collector is used which does not continuously furnish an electric current proportional to the instantaneous concentration of each of the isotopic compounds but which because of an appropriate automatic commutation, furnishes, at successive short intervals, electric indications proportional to the instantaneous concentration of the different isotopic compounds.

Different fractions of the mixture may be removed by conventional means controlled by the electric indications of the mass spectrometer processed by analogic methods or transformed into numerical data to be treated by digital methods.

In order that the invention may be more clearly understood, several embodiments of the invention will now be described without in any way suggesting that the scope of the invention is limited to the details thereof.

Figure 1:
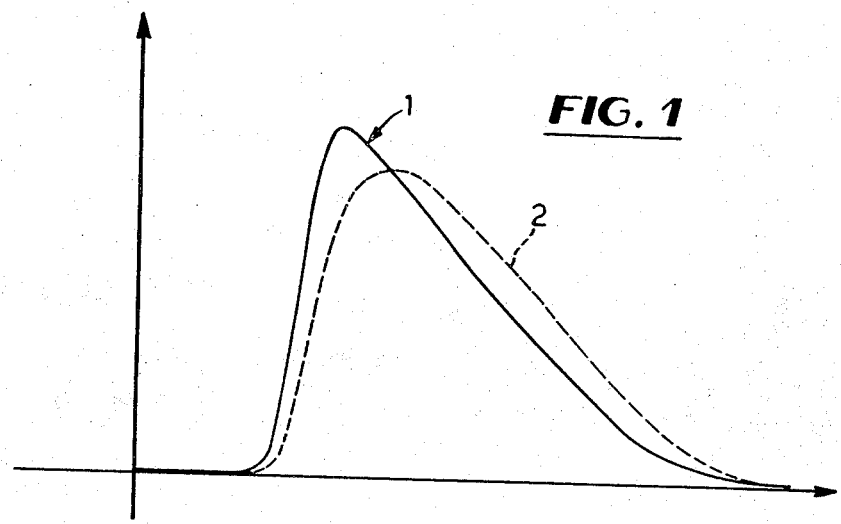
FIG. 1 shows the discharge of the two isotopic compounds recorded at the exit of a separating column as a function of time.

The solid-line curve 1 on FIG. 1 represents the variation in rate of flow of one isotopic compound A measured at the exit of the column, as a funtcion of time, while the broken-line curve 2 represents the variation in rate of flow of the isotopic compound B as a function of time, at the exit of the same column. These two curves each have a maximum and these maximums are often called "peaks."

In the case shown on FIG. 1, the two peaks 1 and 2 are only slightly separated and collection always yields a mixture of the two isotopic compounds A and B.

For enrichment to take place, it is then necessary to choose a fraction of the mixture leaving the column in which the relative proportion of one of the isotopes is higher than the proportion of the same isotope in the starting mixture.

Figure 2:
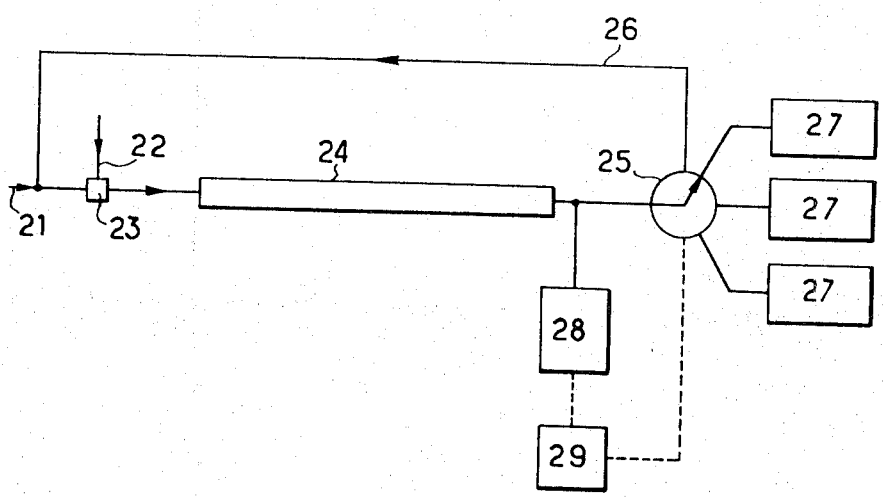
FIG. 2 is a schematic representation of one stage of separation utilizing apparatus conforming to the invention.

FIG. 2 shows the input pipe 21 for the carrier gas, and the input pipe 22 for the isotopic mixture to be enriched. The device 23, which is connected to pipes 21 and 22 to permit periodic introduction of a small quantity of the isotopic mixture into the carrier gas is connected to the separating column 24 which is full of an adsorbing medium such as a molecular sieve.

The outlet of separating column 24 is connected to a controlled distributor 25 which can direct the current of gas coming out of the column either into a recirculation pipe for carrier gas 26, or into fraction collectors 27.

The outlet of the column is also connected to a detector 28 which can detect the appearance of the enriched isotopic mixture, this detector being in turn electrically connected to a control mechanism equipped with a clock for controlling the position of distributor 25.

A small sample of the isotopic mixture is introduced into the stream of carrier gas entering the column by means of mechanism 23. The different isotopic compounds present in the mixture are not drawn through the column 24 at exactly the same speed by the carrier gas and so there is a slight lag in their arrival at the outlet of the column (see FIG. 1).

Detector 28, which is, for example, a mass spectrometer whose operation will be explained below, detects the appearance of isotopic compounds at the exit of the column and alerts command system 29.

A first test allows the mass spectrometer 28 to indicate to the control mechanism 29 the moments during which a fraction coming out of the column should be collected to insure that it is the richest in the isotope which it is desired to separate.

In the case of a mixture of two isotopes, the mixture coming out of the column may be separated into three fractions called a top fraction, a central fraction and a bottom fraction.

If it is the central fraction which is richest in the desired isotopic compound, the preliminary test will show between what times it will be necessary to collect this central fraction and the control mechanism 29 can then be adjusted to automatically direct the distributor to collect the three fractions at a suitable moment in the three containers 27.

If a succession of samples identical to the samples which was used to adjust the column 24 are then sent through detector 28 and control mechanism 29 repeat the above-described operation in the same way and a fraction enriched in one of the isotopes is collected in one of the containers 27.

Figure 3:
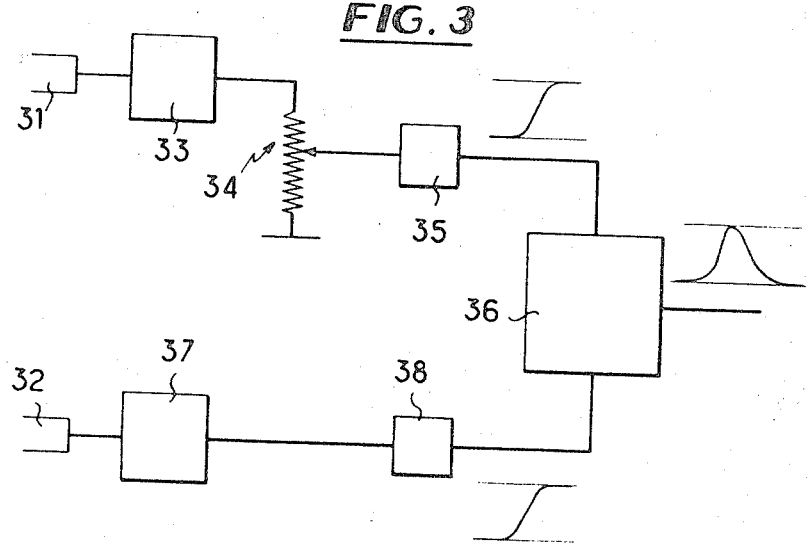
FIG. 3 shows the elements of a detector used in accordance with the invention, together with a mass spectrometer having two ion collectors.

FIG. 3 shows two ion collectors 31 and 32 of a mass spectrometer. Collector 31 is connected through amplifier 33, potentiometer 34 and integrator 35 to one terminal of register 36, collector 32 being connected by amplifier 37 and integrator 38 to another terminal of register 36.

Register 36 records the difference in the currents it receives from integrators 35 and 38.

The currents discharged by ion collectors 31 and 32 are proportional to the rate of flow of each of the two isotopes of a binary isotopic mixture which it is desired to enrich. After amplification by amplifiers 33 and 37, these currents are integrated by integrators 35 and 38. The current coming from collector 31 has already been divided in potentiometric device 34 by a previously determined number which coresponds to the isotopic ratio of the isotopic compound detected by collector 31. This precaution is taken so as to obtain directly from integrators 35 and 38 standardized integrated currents whose variations as a function of time are shown by the curves drawn beside integrators 35 and 38.

Register 36 records the difference between the integrated currents furnished by mechanisms 35 and 38 and shows the variation of the instantaneous enrichment factor as a function of time. The curve shown at the right of mechanism 36 indicates that this factor passes through a maximum which is the enrichment factor of the separation.

It is worthwhile to collect the fraction coming out of the column only during the time when this enrichment factor is passing through its maximum. This choice is made during the preliminary regulation explained above.

Figure 4:
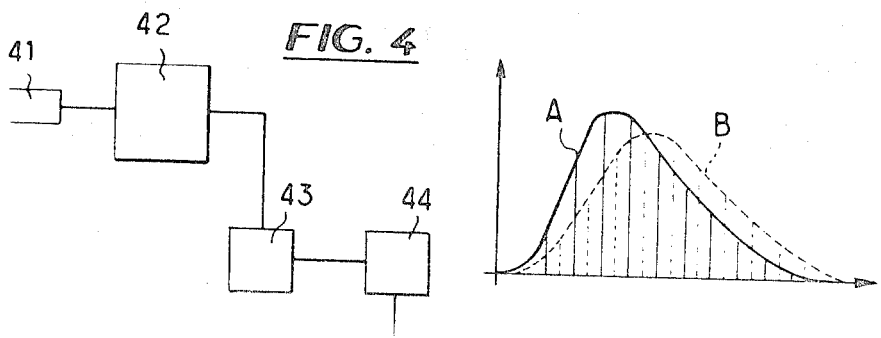
FIG. 4 shows the elements of a detector used in connection with a mass spectrometer having a single ion collector.

FIG. 4 shows a single ion collector of mass spectrometer 41, connected by amplifier 42 to potentiometer 43.

Potentiometer 43 is connected to digital converter 44 which is connected to two independent counters 45 and 46. Counter 45 is connected by analog-to-digital converter 47 to register 48 while counter 46 is connected by analog-to-digital converter 49 to register 48.

In this embodiment, periodic measurements of the rate of flow of each of the two isotopic compounds contained in the mixture leaving the column are made, using the single collector 41 and periodic variations in the analysing magnetic field of the mass spectrometer.

The currents furnished by collector 41 are amplified by amplifier 42 and divided in the usual way by potentiometer 43 so as to be standardized before being sent to analog-to-digital converter 44 which transforms these currents into a number of impulses proportional to said currents. These impulses are sent alternately to counter 45 and counter 46 at each cycle of measurement of collector 41.

The curve shown at the upper right of the figure shows the exact times at which the measurements of isotopic compound A are carried out, represented in solid vertical lines, while the exact time at which the measurements of isotopic compound B are carried out are shown in broken vertical lines.

The digital-to-analog converters 47 and 49 convert the number of pulses stored in the counters 45 and 46 back into a current, the stepped variations of which are shown at the left of converters 47 and 49. These variations in level are due to the discontinuity introduced into the measurements by the use of this method. It suffices to increase the number of measures, which may easily be done, in order that the stepped curves might be easily assimilated to actual curves.

The register 48 makes it possible to record the differences between the currents supplied by the converters 47 and 49, that is to say, to measure the factor of enrichment as a function of time and to determine the moment at which this factor is at its maximum.

A mixture of natural carbon monoxides containing carbon isotopes having atomic weights of 12 and 13 so that the monoxides have oxides $C_{12}O$ and $C_{13}O$, have molecular weights of 28 and 29, was isotopically enriched in the following manner:

A 5 A. molecular sieve reduced the mixture to a powder the grains of which had diameters between 0.42 mm. and 0.50 mm., which was dehydrated for 15 hours at 200° C. under a helium current. The powder was introduced into a column 6 meters long and 4 mm. in diameter at a temperature of 248° K. The carrier gas is helium which is circulated at the rate of 1.1 cm.³ per second. 2 cm.³ of natural carbon monoxides are introduced per minute. The column produces a maximum enrichment of 13% during a single passage of the mixture through the column.

When the process is repeated a large number of times either on column mounted in series, or by recycling the enrichment mixture through the first column, the enrichment factor may be considerably increased, and it is even possible to completely separate the isotopes.

The following table gives the results obtained by a single passage of an isotopic mixture of natural carbon oxide through a column identical to the one hereinbefore described, under various conditions.

| Nature of the stationary phase | Granulometry (mm.) | Temperature of the column in ° K. | Enrichment factor | Retention time in seconds |
|---|---|---|---|---|
| 5 A. molecular screen | 0.22–0.31 | 77 | 11.5 | 3,000 |
| 5 A. molecular screen | 0.22–0.31 | 63 | 22 | 14,700 |
| Activated carbon | 0.22–0.31 | 77 | 5.0 | 5,520 |
| Silica gel | 0.22–0.31 | 77 | 2.3 | 1,560 |

We claim:
1. Process for at least partially separating at least one carbon oxide isotopic compound from an isotopic mixture of carbon oxides which comprises the steps of periodically adding the isotopic mixture in fluid form in relatively small quantities to a gaseous carrier which is continuously circulated, while carrying said mixture through an enclosure containing a porous molecular sieve adsorbent which is inert to the gaseous carrier, deriving an indication of the appearance of the isotopic mixture at the outlet of the enclosure, and controlling in response to said indication the collection of different fractions of said mixture in separate collectors.

2. A process as claimed in claim 1 according to which the steps of claim 1 are repeated a number of times.

3. A process as claimed in claim 2 in which each of the collected fractions is separated from the gaseous carrier before the steps of claim 1 are repeated.

4. A process as claimed in claim 1 in which said indication is derived from a mass spectrometer and has a value proportional to the instantaneous enrichment factor of the component as a function of time.

5. A process as claimed in claim 4 in which a fraction of said isotopic mixture is separated out at the time the enrichment factor of one of the isotopic components of said compound is at its maximum.

References Cited

UNITED STATES PATENTS

| | | | |
|---|---|---|---|
| 2,610,260 | 9/1952 | Moffett. | |
| 2,780,526 | 2/1957 | Fleck | 55—79 |
| 2,977,472 | 3/1961 | Kratochvil. | |
| 3,002,583 | 10/1961 | Findlay | 55—197 |
| 3,267,646 | 8/1966 | Kauss et al. | 55—197 |
| 3,348,447 | 10/1967 | Goleb. | |

REUBEN FRIEDMAN, Primary Examiner

C. N. HART, Assistant Examiner

U.S. Cl. X.R.

55—68, 75